(12) United States Patent
Tsai et al.

(10) Patent No.: US 7,547,875 B1
(45) Date of Patent: Jun. 16, 2009

(54) ABSOLUTE TYPE ENCODER APPARATUS AND METHOD FOR OPERATING THE SAME

(75) Inventors: Chin-Shiong Tsai, Taoyuan Shien (TW); Po-Ming Chen, Taoyuan Shien (TW); Meng-Chang Lin, Taoyuan Shien (TW); Cheng-Ping Lin, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 12/128,869

(22) Filed: May 29, 2008

(51) Int. Cl.
*G01D 5/34* (2006.01)
(52) U.S. Cl. .................. 250/231.14; 250/205; 341/11
(58) Field of Classification Search ..................
250/231.13–231.18, 205, 214 R; 341/11, 341/13
See application file for complete search history.

(56) References Cited

U.S. PATENT DOCUMENTS

| | | | | |
|---|---|---|---|---|
| 4,079,251 A | * | 3/1978 | Osann, Jr. ............. | 250/231.16 |
| 4,384,204 A | * | 5/1983 | Tamaki et al. ........... | 250/237 G |
| 5,774,068 A | * | 6/1998 | Seki ...................... | 340/870.31 |
| 6,246,343 B1 | * | 6/2001 | Deng et al. .................. | 341/11 |
| 6,630,659 B1 | * | 10/2003 | Stridsberg .............. | 250/231.13 |
| 6,963,063 B2 | * | 11/2005 | Johnson ................. | 250/231.13 |
| 2003/0160159 A1 | * | 8/2003 | Chung ................... | 250/231.13 |

* cited by examiner

*Primary Examiner*—Que T Le
*Assistant Examiner*—Kevin Wyatt

(57) ABSTRACT

A high-precision absolute type encoder apparatus includes a controller electrically connected to an incremental type encoder and generating a control signal to the incremental type encoder, a comparator electrically connected to outputs of the incremental type encoder and generating first pulse signals, a latch unit electrically connected to outputs of the comparator and generating second pulse signals by latching the generating first pulse signals. When power failure occurs, the controller generates the control signal as successive pulses with predetermined period to drive the latch unit and the incremental type encoder. Therefore, the controller knows angular information of the incremental type encoder by counting the second pulse signals. The absolute angular information can be obtained by combining the angular information and an initial position after power failure.

6 Claims, 6 Drawing Sheets

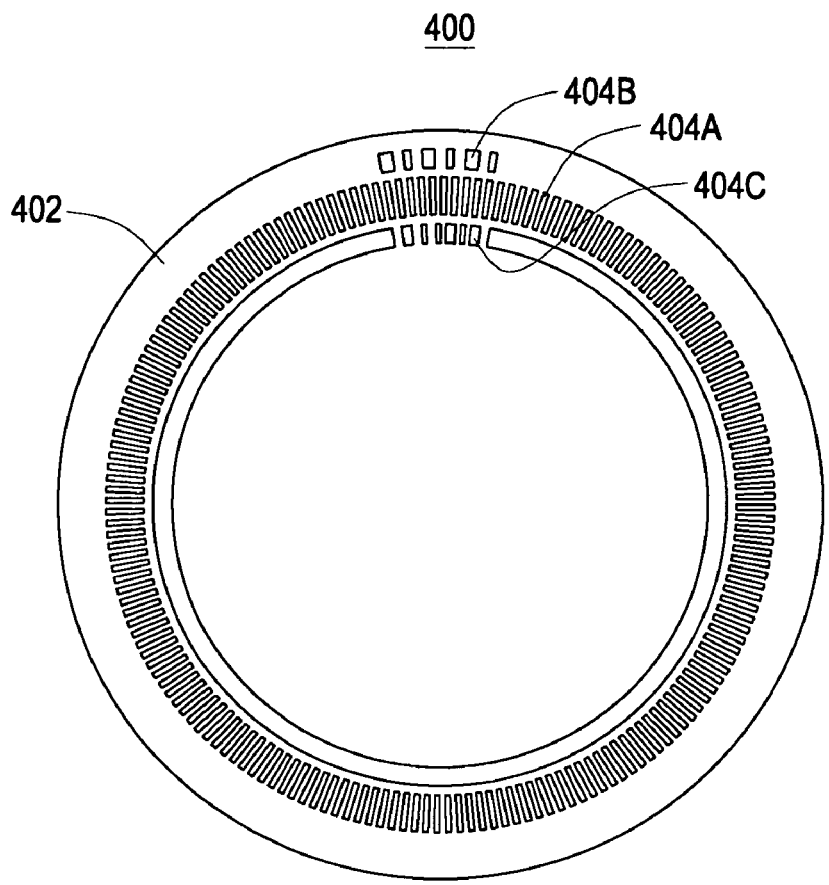
**FIG.4A
PRIOR ART**
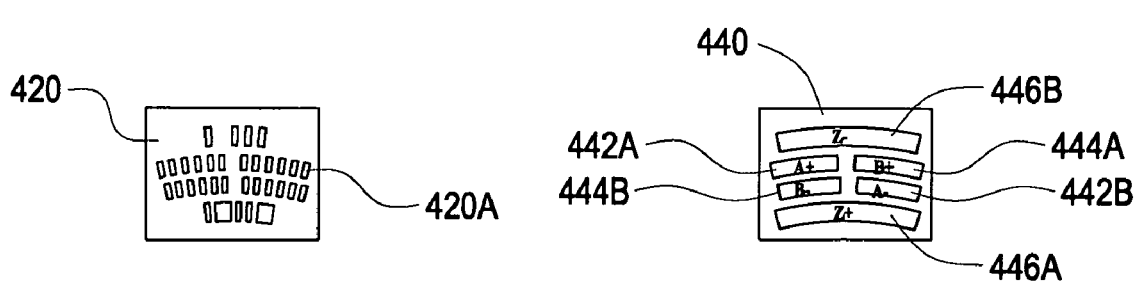
**FIG.4B
PRIOR ART**
**FIG.4C
PRIOR ART**

ABSOLUTE TYPE ENCODER APPARATUS AND METHOD FOR OPERATING THE SAME

BACKGROUND OF THE INVENTION

1. Field of the Invention

The present invention relates to an absolute type encoder apparatus and method for operating the same, especially to a high-precision absolute type encoder apparatus providing absolute position information in power failure condition and method for operating the same.

2. Description of Related Art

The conventional AC servo motor generally comprises an optical encoder to sense angle information of a rotor; this angle information can be used to determine a stator driving current. Therefore, the speed of the AC servo motor can be precisely controlled.

FIG. 1 shows the schematic diagram of a prior art AC servo motor. The angular position of rotor in a motor 10 is detected by an optical encoder 12 and processed by a signal processing unit 20 to obtain angular information. The angular information is processed by a speed estimation unit 14 to obtain an estimated motor rotational speed. A speed controller 30 receives the estimated motor rotational speed and a speed command to control a controller module 32 and an IGBT module 34 in order to generate a motor speed control signal. The motor speed control signal can be used to precisely control the rotational speed of the motor 10.

More particularly, in the servo motor, the position sensor attached to the motor axis is the optical encoder 12. The position precision of the servo motor depends on the resolution of the optical encoder, where the optical encoder 12 can be classified to incremental-type encoder and absolute-type encoder.

The incremental-type encoder can provide information relative to previous position, and the absolute position of its encoder wheel cannot be known after power failure unless the position is reset. Therefore, the incremental-type encoder can not know the absolute position (namely absolute angle) of its encoder wheel after power is just regained after power failure. On the contrary, the absolute-type encoder can always know the absolute position of the output axis without bothering by power failure. No reset operation is necessary after power on from power failure and the operation is simplified.

FIG. 2 shows the schematic view of an optical encoder. The light from a light source 260 reaches a light sensor 240 after passing a rotating wheel 200 and a fixed mask 220. The signal received by the light sensor 240 is varied according to the position change of the rotating wheel 200. Therefore, the position change of the rotating wheel 200 can be known by detecting the signal intensity of the light sensor 240.

FIG. 3 shows a schematic diagram of an absolute-type encoder wheel 300, which is a 6 bit encoder wheel. The absolute-type encoder wheel 300 comprises a round wheel body 302 and a plurality of gratings 304. The gratings 304 include a first grating 304A at innermost orbit and occupying ½ circumference, two second gratings 304B at second innermost orbit and each occupying ¼ circumference, third gratings 304C, fourth gratings 304D, fifth gratings 304E and 32 sixth grating 304F at outermost orbit and each occupying 1/64 circumference. Intensity-changing signal can be obtained along the radial direction and position resolution of $2^6=64$ can be achieved along circumference direction. However, one more orbit is needed when one bit resolution is to be enhanced in the absolute-type encoder wheel 300 shown in FIG. 3. The absolute-type encoder wheel 300 occupies more space when resolution is more demanding. The absolute-type encoder wheel 300 shown in FIG. 3 has FIG. 4A shows a schematic diagram of an encoder wheel 400 for an incremental-type optical encoder, which comprises a round wheel body 402 and a plurality of gratings. The gratings include main grating 404A, first sub grating 404B and second sub grating 404C, where the first sub grating 404B and the second sub grating 404C are arranged on two opposite sides of the main grating 404A. FIG. 4B shows the mask 420 associated with the encoder wheel 400, which comprises four rows of gratings 420A.

FIG. 4C shows the light sensor device 440 associated with the encoder wheel 400, which comprises main sensor units 442A, 444A, 442B, 444B (labeled as A+/B+/A−/B−) corresponding to the main grating 404A. When the encoder wheel 400 rotates, the main sensor units 442A, 444A, 442B, 444B (labeled as A+/B+/A−/B−) produces four sinusoid-like signals. The four sinusoid-like signals have phases of 0/90/180/270 degrees, respectively. The A+/A− signals with 180 degree phase difference are subjected to subtraction operation to obtain a sine signal A without common mode noise. The B+/B− signals with 180 degree phase difference are subjected to subtraction operation to obtain a cosine signal B without common mode noise. The sine signal A and cosine signal B with 90 degree phase difference can be used to judge forward or backward rotation.

The incremental-type optical encoder can obtain incremental position information based on the sine signal A and cosine signal B. To obtain absolute position information, origin sensor unit 446A, 446B (Z+/Z−) are additionally provided. However, after power on from power failure, an origin mark on the incremental encoder should be sensed by the origin sensor unit to obtain the absolute position information. This process is time consuming and not suitable for application demanding no return to the origin mark.

To solve the problem of absolute position in power failure, two approaches are proposed in related art.

1. Mechanical Counting:

A gear set with a plurality of inter-engaged gears is provided for counting revolution number. FIG. 5 shows the example of mechanical encoder, wherein a spindle is linked with a first gear and the first gear is linked with a second gear.

Absolute codes are marked on each gear and the gear is assumed to provide n absolute position after one revolution. Separated laser diode and photo diode are used for detect the absolute codes. Moreover, the gear set can identify n*n*n revolution of the spindle.

2. Absolute Encoder Counting Revolution with Battery

In power failure state, a battery supplies electric power to a dedicated chip. The dedicated chip triggers a laser diode in predetermined time and a photo diode can find the absolution position information and then count the revolution number in forward and backward direction.

After regular power is again supplied to the encoder, the dedicated chip knows the accumulated revolution number and the current absolution position information. The absolution position information can be refined by interpolation. However, the absolution position information may have error at boundary. Moreover, powder on encode wheel may cause measurement error. Therefore, the exact absolution position information should be checked at certain calibration points.

In other word, the exact absolution position information cannot be instantaneously obtained after regular power is regained.

SUMMARY OF THE INVENTION

It is the object of the present invention to provide a high-precision absolute type encoder apparatus providing absolute position information in power failure condition and method for operating the same.

Accordingly, the high-precision absolute type encoder apparatus of the present invention includes a controller electrically connected to an incremental type encoder and generating a control signal to the incremental type encoder, a comparator electrically connected to outputs of the incremental type encoder and generating first pulse signals, a latch unit electrically connected to outputs of the comparator and generating second pulse signals by latching the generating first pulse signals. When power failure occurs, the controller generates the control signal as successive pulses with predetermined period to drive the latch unit and the incremental type encoder. Therefore, the controller knows angular information of the incremental type encoder by counting the second pulse signals. The absolute angular information can be obtained by combining the angular information and an initial position after power failure.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 4A shows a schematic diagram of an encoder wheel for an incremental-type optical encoder FIG. 4B shows the mask associated with the encoder wheel in FIG. 4A.

FIG. 4C shows the light sensor device associated with the encoder wheel in FIG. 4A.

DETAILED DESCRIPTION OF THE INVENTION

In the present invention, the resolution of the absolution position information is enhanced by creating A, B pulses similar to those in incremental-type encoder instead of counting revolution numbers. Therefore, the absolution position information is obtained by counting A, B pulses during both power failure period and regular power period to enhance resolution.

Figure 1:
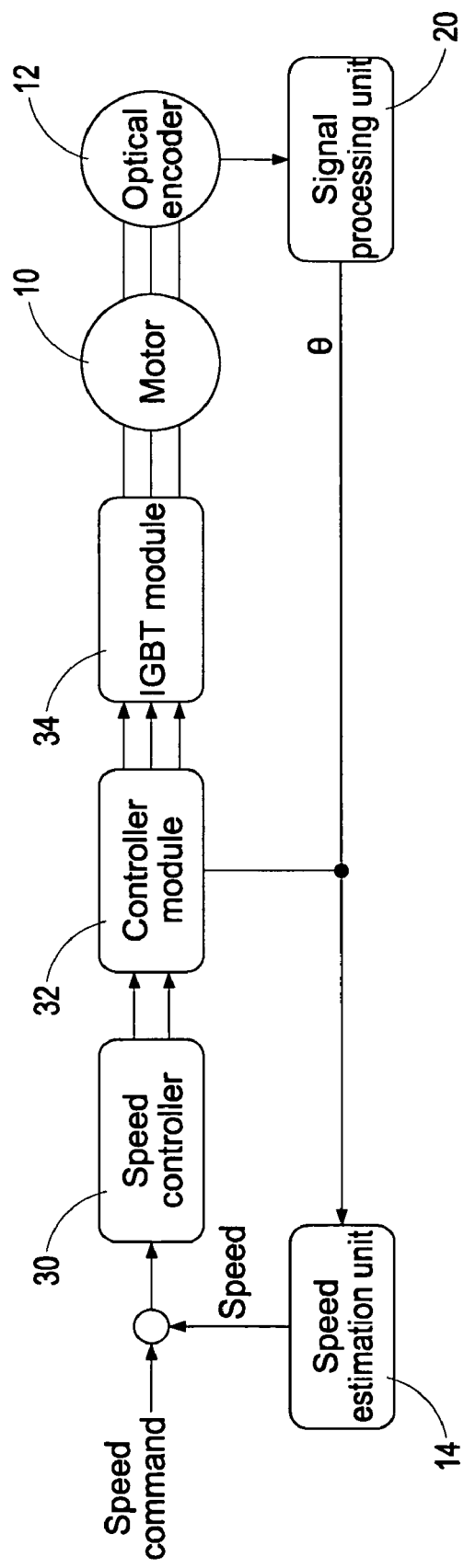
FIG. 1 shows the schematic diagram of a prior art AC servo motor.
Figure 2:
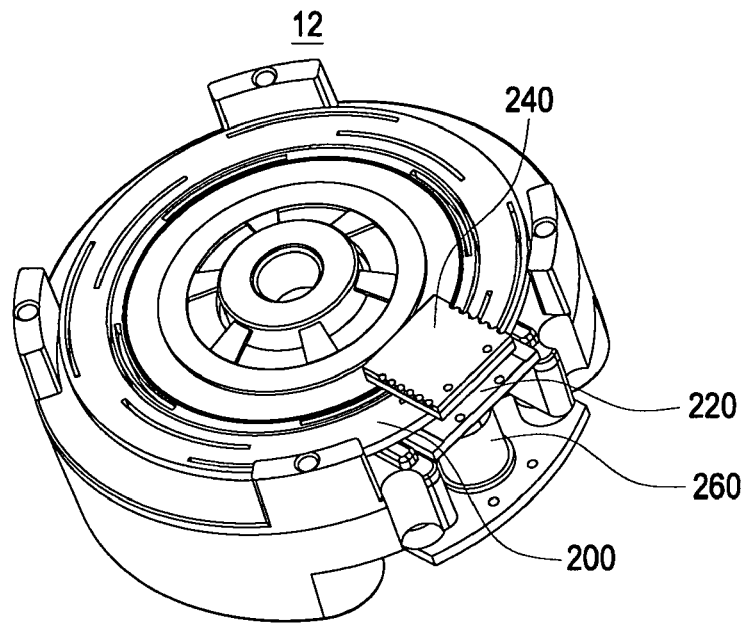
FIG. 2 shows the schematic view of an optical encoder.
Figure 3:
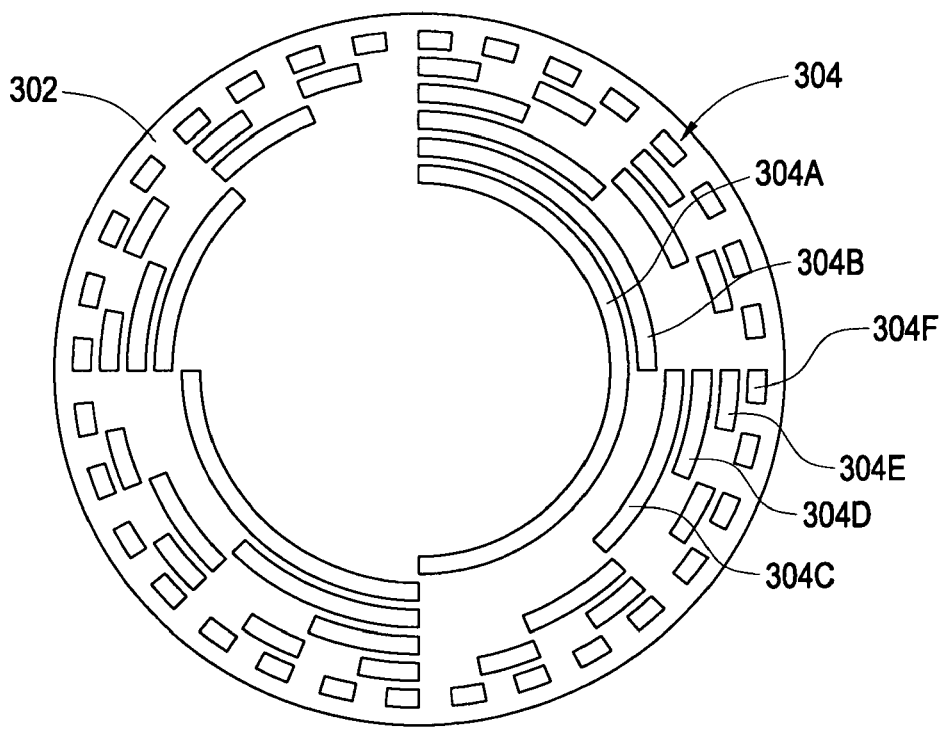
FIG. 3 shows a schematic diagram of an absolute-type encoder wheel.
Figure 6:
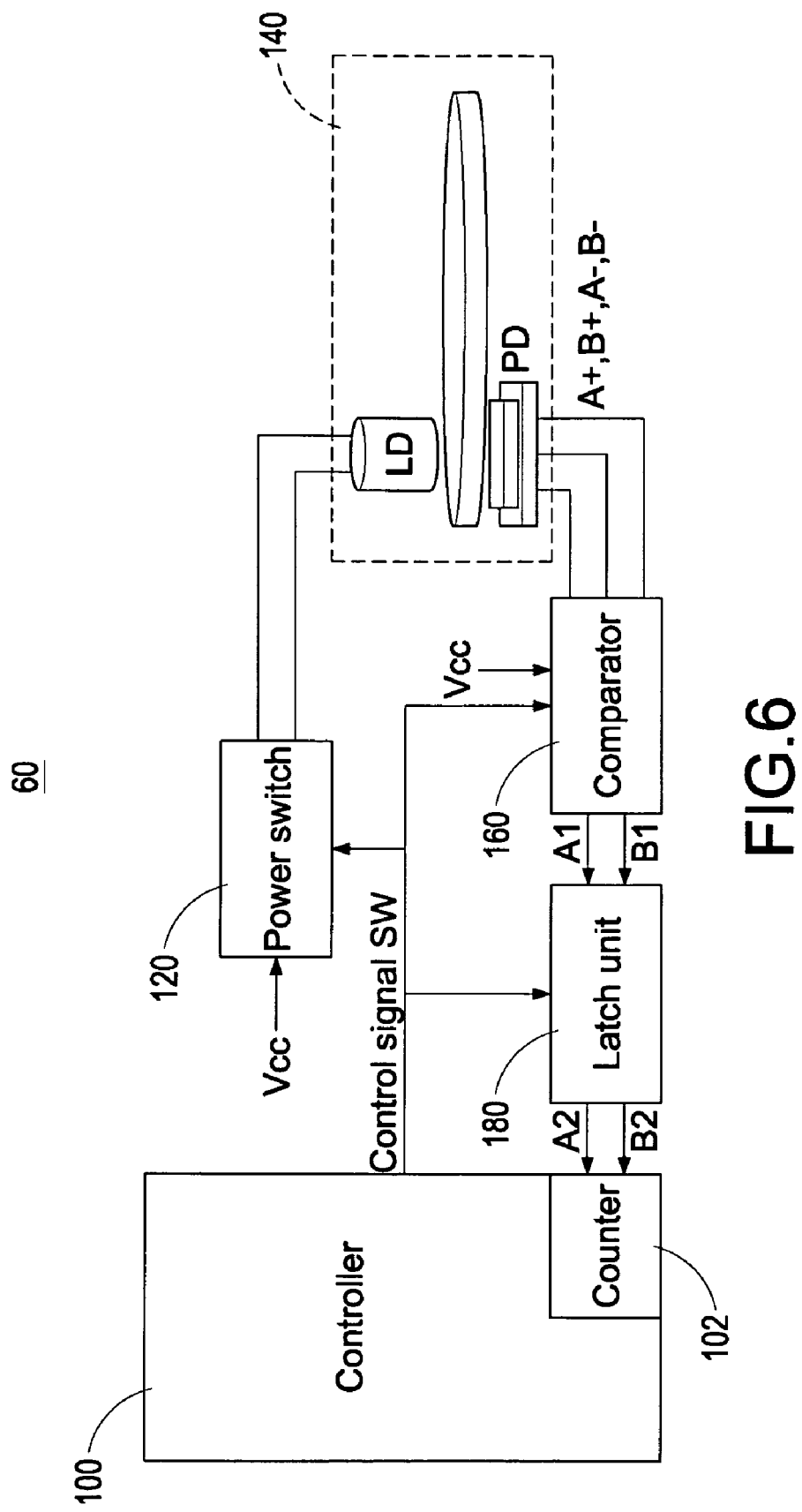
FIG. 6 shows the schematic view of the high-precision absolute type encoder apparatus 60 of the present invention.

FIG. 6 shows the schematic view of the high-precision absolute type encoder apparatus 60 of the present invention. The encoder apparatus 60 comprises a controller 100, a power switch 120, an incremental type encoder 140, a comparator 160, a latch unit 180 and a battery (not shown, providing Vcc), wherein the battery can provide electric power to other components shown in FIG. 6. The incremental type encoder 140 is a conventional incremental type encoder 140 as that shown in FIG. 2, and comprises a laser diode LD, a photo diode PD and an encoder wheel (not labeled). The controller 100 is electrically connected to the power switch 120 and provides a control signal SW to the power switch 120, thus selectively controlling the laser diode LD to continuously light on (normal mode, or a quasi normal mode, which will be detailed later), or to successively and discontinuously light on in pulse manner (battery mode). Moreover, the controller 100 is also electrically connected to the comparator 160 and the latch unit 180. The photo diode PD generates 0/180 phase signals (A+, A−) and 90/270 phase signals (B+, B−); and the comparator 160 processes the signals output from the photo diode PD to generate first pulse signals A1 and B1. The first pulse signals A1 and B1 are processed by the latch unit 180 to generate second pulse signals A2 and B2. The second pulse signals A2 and B2 are processed by a counter 102 in the controller 100 to obtain an incremental position information. Therefore, the controller 100 knows the absolute position information of the encoder wheel with reference to the incremental position information after power failure and an initial position information just before power failure.

Figure 5:
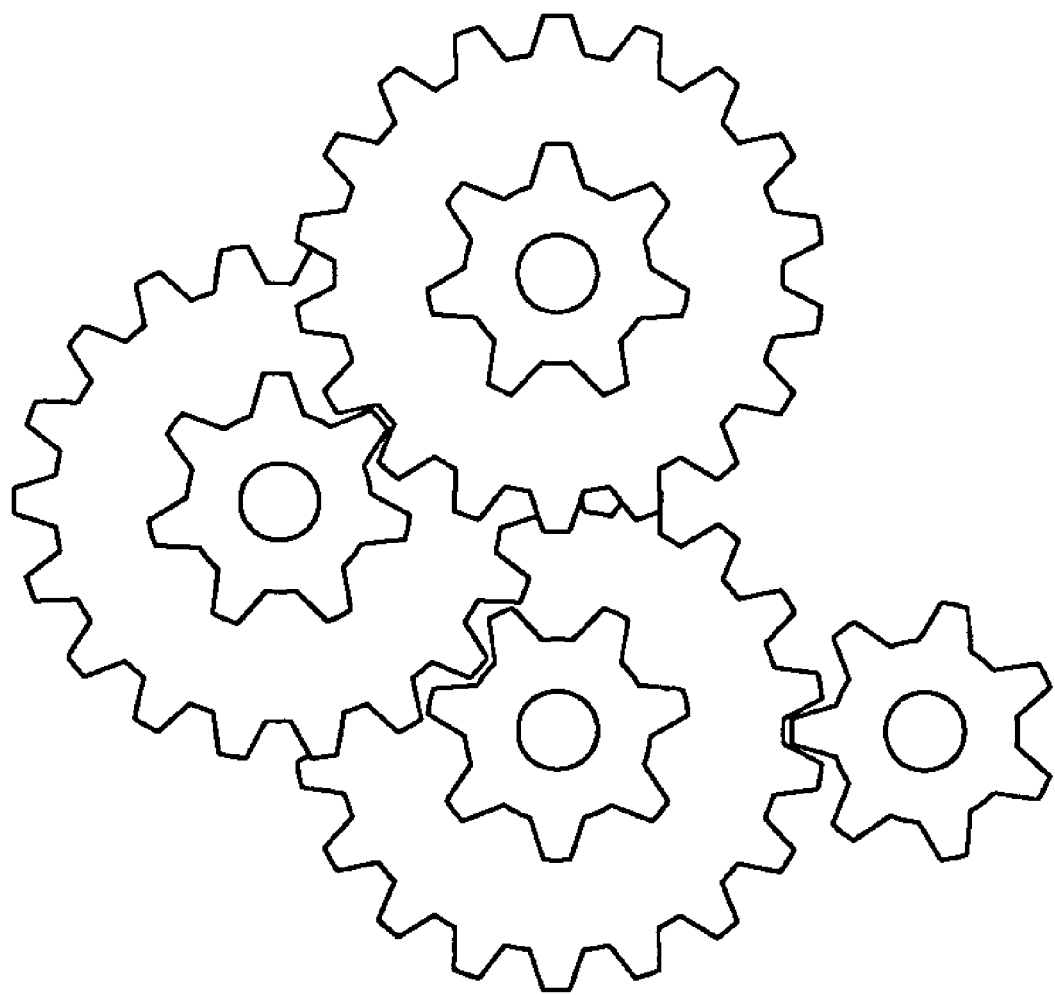
FIG. 5 shows the example of mechanical encoder.
Figure 7:
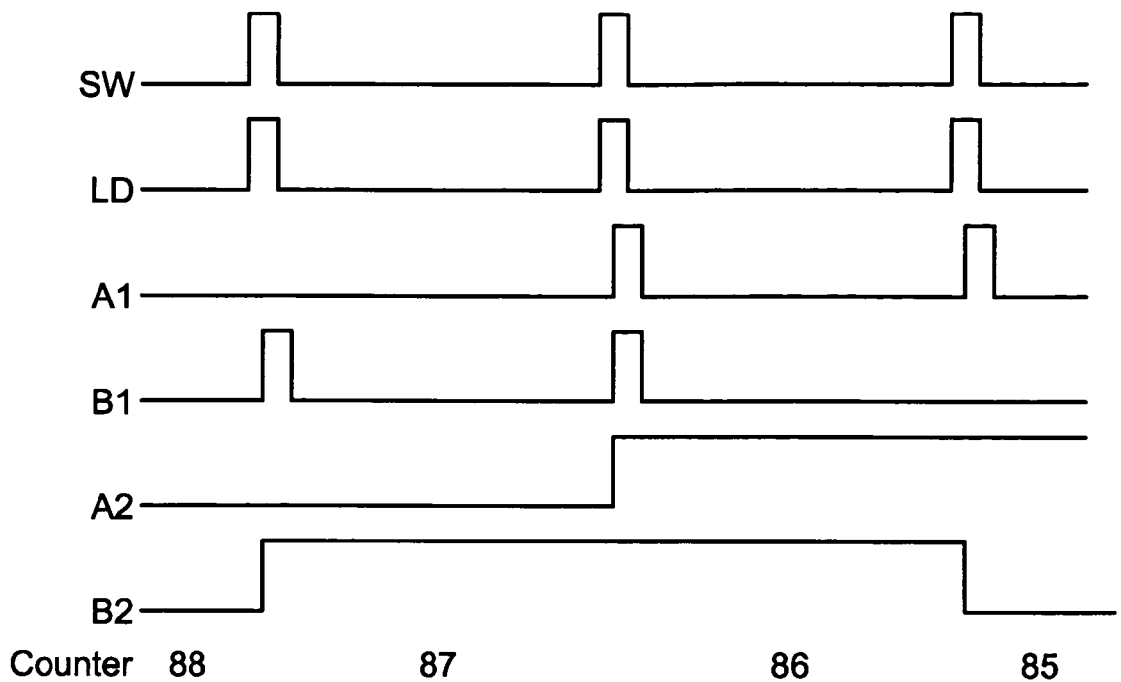
FIG. 7 shows some waveforms associated with the encoder apparatus 60 in FIG. 5.

FIG. 7 shows some waveforms associated with the encoder apparatus 60 in FIG. 5. The controller 100 has firmware design or logic design to generate the control signal SW shown in FIG. 7. The control signal SW turns on the laser diode LD when its state is high. The photo diode PD generates pulse signals in response to the light passing through the encoder wheel and the mask in the encoder apparatus 60. The pulse signals (A+/B+/A−/B−) of photo diode PD are differentially processed by the comparator 160 to obtain the first pulse signals A1 and B1. The latch unit 180 processes the first pulse signals A1 and B1 under the control of the control signal SW to generate the second pulse signals A2 and B2. The second pulse signals A2 and B2 are equivalent to the first pulse signals A1 and B1 in the condition that the laser diode LD is continuously on. The second pulse signals A2 and B2 have shorter duration when the encoder wheel has higher rotation speed, which will be detailed later.

The control signal SW is used to generate the first pulse signals A1 and B1, therefore, the control signal SW has shorter period than that of the absolute encoder counting revolution with battery. For example, if the resolution of the encoder wheel is 512 ppr, and the rotation speed is 60 rpm, then the period of the first pulse signals A1 and B1 is 60 s/60/512=(1/512) s=: 2 ms. The period of the control signal SW is no more than 2/5 ms=0.4 ms for correctly counting the first pulse signals A1 and B1. The on time (with logical High value) of the control signal SW depends on the response characteristic of the laser diode LD and the photo diode PD. When regular power is supplied, the control signal SW is continuously on to obtain the position information (normal mode). When power fails, the controller 100 will switch to a battery mode as long as the rotation speed is sufficiently small, for example, below 30 rpm. In battery mode, the controller 100 is powered by the battery to trigger the control signal SW to successively and discontinuously turn on in pulse manner with 0.4 ms period. The controller 100 uses the counter 102 thereof to calculate the rotation speed. When rotation speed of the encoder wheel is more than 30 rpm in power failure condition, the controller 100 is powered by the battery to trigger the control signal SW to continuously on. Therefore, the position information can be precisely known.

When rotation speed of the encoder wheel is again below 30 rpm in power failure condition, the controller 100 again triggers the control signal SW to successively and discontinuously turn on in pulse manner with 0.4 ms period. As shown in FIG. 7, the rotation speed of the encoder wheel is generally not high in power failure condition, and the control signal SW, which successively turns on in pulse manner with 0.4 ms period, is sufficient to generate the count result of 88, 87, 86, 85. Therefore, the controller 100 can know the absolute position information with reference to the incremental position information after power failure and an initial position information before power failure.

Figure 8:
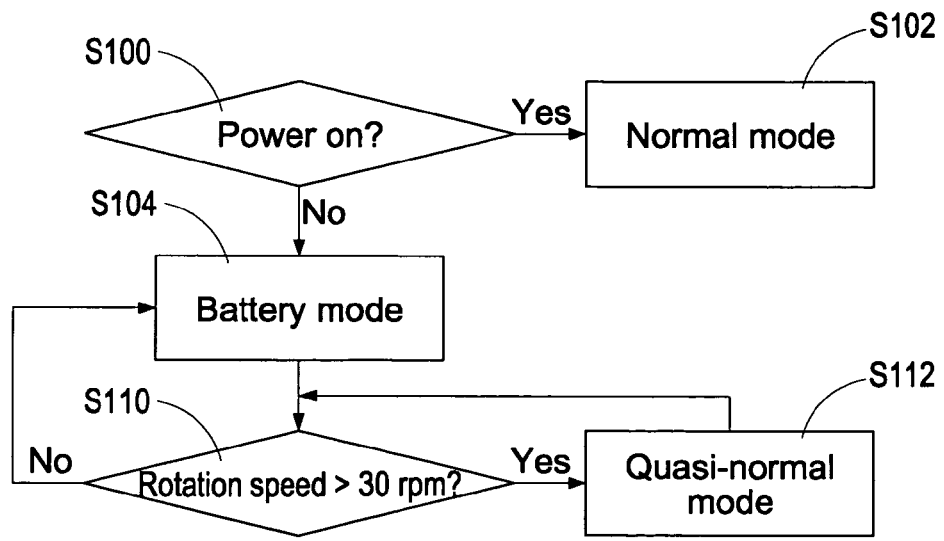
FIG. 8 shows a flowchart explaining the operation of the high-precision absolute type encoder apparatus according to the present invention.

FIG. 8 shows a flowchart explaining the operation of the high-precision absolute type encoder apparatus according to the present invention. The power condition is checked in step S100 and the controller 100 drives the control signal SW in continuously on state when the power condition is regular (S102). When the power fails (for example, three phase power supplied to a motor is abnormal) and the rotation speed of the encoder wheel is not high, the controller 100 switches operations to a battery mode (S104), wherein the controller 100 drives the control signal SW in successive pulse manner. Afterward, the controller 100 detects whether the rotation speed of the encoder wheel is more than 30 rpm (S110). If the rotation speed of the encoder wheel is more than 30 rpm, the controller 100 switches operations to a quasi normal mode (S112), wherein the controller 100 is powered by a battery to drive the control signal SW in continuously on state. Therefore, the position information of the encoder wheel can be precisely known. If the rotation speed of the encoder wheel is less than 30 rpm, the controller 100 keeps operations in battery mode (S104).

To sum up, the high-precision absolute type encoder apparatus according to the present invention has following features:

1. The laser diode is driven in pulse manner in power fail condition and the revolution of the encoder wheel is not calculated with reference to absolute position. Therefore, the absolute type encoder apparatus according to the present invention can calculate position information and carry the revolution number by pulse signals A, B, which are produced in a manner like regular power condition.

2. The pulse signals A, B generated by pulse control signal are latched to simulate pulse signals generated by continuously-on control signal. Therefore, the counter has normal operation in power fail condition.

3. The period of the control signal can be changed to count pulse generated by different rotation speeds.

What is claimed is:

1. An absolute type encoder apparatus employing an incremental type encoder and a battery to obtain absolute position information in power failure condition, the incremental type encoder comprising a laser diode, an encoder wheel and a photo diode, the absolute type encoder apparatus comprising:
    a controller electrically connected to the incremental type encoder and supplying a control signal to the incremental type encoder;
    a comparator electrically connected to the incremental type encoder and processing outputs of the incremental type encoder to generate first pulse signals;
    a latch unit electrically connected to the controller and the comparator, wherein the latch unit is controlled by the control signal to process the first pulse signals to generate second pulse signals;
    wherein the controller is adapted to send the control signal of successive pulses and to calculate the second pulse signals to know the absolute position information in power failure condition, and the controller sends the control signals of continuously on state when a rotation speed of the encoder wheel is more than 30 rpm.

2. The absolute type encoder apparatus in claim 1, wherein the latch unit latches the first pulse signals when the control signal is high in power failure condition.

3. The absolute type encoder apparatus in claim 1, wherein the encoder wheel has resolution of 512 ppr and the control signal of successive pulses has period of 0.4 ms.

4. A method for obtaining absolute position information in power failure condition by using an incremental type encoder and a battery, the incremental type encoder comprising a laser diode, an encoder wheel and a photo diode, the method comprising:
    driving the incremental type encoder by a control signal of successive pulses when a rotation speed of the incremental type encoder is lower than a predetermined threshold in power failure condition, the incremental type encoder generating first pulse signals by the driving of the control signal;
    latching the first pulse signals under the control of the control signal to generate second pulse signals;
    calculating a position information of the incremental type encoder based on the second pulse signals; and
    sending the control signal as continuously on state when the rotation speed of the incremental type encoder is larger than the predetermined threshold in power failure condition.

5. The method as claim 4, wherein the predetermined threshold is 30 RPM.

6. The method in claim 4, wherein the encoder wheel has resolution of 512 ppr and the control signal of successive pulses has period of 0.4 ms.

* * * * *